(12) United States Patent
Funayama et al.

(10) Patent No.: US 12,021,426 B2
(45) Date of Patent: Jun. 25, 2024

(54) STATOR WITH COIL HAVING FIRST AND SECOND JOINT PARTS AND CORE HAVING FASTENING MEMBER

(71) Applicants: AISIN CORPORATION, Kariya (JP); TOYOTA JIDOSHA KABUSHIKI KAISHA, Toyota (JP)

(72) Inventors: Tetsuya Funayama, Kariya (JP); Junichi Yokota, Kariya (JP); Yasunori Suzuki, Kasugai (JP)

(73) Assignees: AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 349 days.

(21) Appl. No.: 17/440,126

(22) PCT Filed: Dec. 6, 2019

(86) PCT No.: PCT/JP2019/047791
§ 371 (c)(1),
(2) Date: Sep. 16, 2021

(87) PCT Pub. No.: WO2020/194890
PCT Pub. Date: Oct. 1, 2020

(65) Prior Publication Data
US 2022/0158515 A1 May 19, 2022

(30) Foreign Application Priority Data

Mar. 22, 2019 (JP) .................. 2019-054417

(51) Int. Cl.
*H02K 3/50* (2006.01)
*H02K 3/38* (2006.01)

(52) U.S. Cl.
CPC .................. *H02K 3/50* (2013.01); *H02K 3/38* (2013.01); *H02K 2203/06* (2013.01)

(58) Field of Classification Search
CPC .. H02K 3/50; H02K 3/28; H02K 3/18; H02K 3/38; H02K 3/48; H02K 3/522;
(Continued)

(56) References Cited

U.S. PATENT DOCUMENTS

| 6,137,202 A * | 10/2000 | Holmes | H02K 3/522 29/598 |
| 7,646,131 B2 * | 1/2010 | Georg | H02K 29/03 310/216.069 |

(Continued)

FOREIGN PATENT DOCUMENTS

| DE | 11 2016 001 697 T5 | 12/2017 |
| JP | 2017-050937 A | 3/2017 |
| WO | 2018/079187 A1 | 5/2018 |

OTHER PUBLICATIONS

Feb. 1, 2022 Extended Search Report issued in European Patent Application No. 19921967.6.
(Continued)

*Primary Examiner* — Maged M Almawri
(74) *Attorney, Agent, or Firm* — Oliff PLC

(57) ABSTRACT

The stator is provided with a first joint part provided so as to extend in a radial direction as viewed in a rotation axis line direction; and a second joint part provided at a location corresponding to a fastening member and provided so as to extend in the rotation axis line direction so as not to overlap the fastening member.

13 Claims, 6 Drawing Sheets

(58) Field of Classification Search
CPC ...... H02K 11/05; H02K 11/30; H02K 11/049; H02K 1/223; H02K 1/226; H02K 1/16; H02K 1/165; H02K 1/146; H02K 1/2786; H02K 15/0031; H02K 15/0062; H02K 15/022; H02K 21/22
USPC .................................. 310/71, 88, 178–208
See application file for complete search history.

(56) References Cited

U.S. PATENT DOCUMENTS

| | | | | |
|---|---|---|---|---|
| 8,390,159 | B2* | 3/2013 | Koike | H02K 3/12 310/260 |
| 9,577,498 | B2* | 2/2017 | Isoda | H02K 15/022 |
| 9,729,030 | B2* | 8/2017 | Isoda | H02K 3/32 |
| 10,763,719 | B2* | 9/2020 | Hashimoto | H02K 1/165 |
| 11,063,487 | B2* | 7/2021 | Koga | H02K 3/04 |
| 2004/0135440 | A1* | 7/2004 | Higashino | H02K 7/04 310/254.1 |
| 2009/0200888 | A1* | 8/2009 | Tanaka | H02K 3/28 310/195 |
| 2010/0187918 | A1* | 7/2010 | Takahashi | H02K 15/12 310/43 |
| 2010/0201212 | A1* | 8/2010 | Urano | H02K 3/18 310/71 |
| 2010/0207467 | A1* | 8/2010 | Urano | H02K 3/522 310/71 |
| 2010/0275436 | A1* | 11/2010 | Kiyono | H02K 15/12 29/596 |
| 2010/0327680 | A1* | 12/2010 | Miyachi | H02K 11/028 310/71 |
| 2011/0239442 | A1* | 10/2011 | Utaka | H02K 15/0037 29/596 |
| 2011/0241462 | A1* | 10/2011 | Utaka | H02K 3/12 310/71 |
| 2012/0019081 | A1 | 1/2012 | Tamura et al. | |
| 2012/0286593 | A1* | 11/2012 | Yokogawa | H02K 3/522 310/43 |
| 2014/0070646 | A1* | 3/2014 | Isoda | H02K 15/0062 310/71 |
| 2014/0125173 | A1* | 5/2014 | Hayashi | H02K 5/10 310/88 |
| 2015/0128406 | A1* | 5/2015 | Isoda | H02K 3/325 29/596 |
| 2015/0155750 | A1* | 6/2015 | Hashimoto | H02K 1/02 310/43 |
| 2015/0207374 | A1* | 7/2015 | Tsuiki | H02K 3/12 310/202 |
| 2015/0222156 | A1* | 8/2015 | Tomizawa | H02K 5/10 310/88 |
| 2016/0043604 | A1* | 2/2016 | Yoshida | H02K 3/325 310/71 |
| 2016/0336831 | A1* | 11/2016 | Horizumi | H02K 11/33 |
| 2017/0302139 | A1* | 10/2017 | Sakai | H02K 11/33 |
| 2018/0115211 | A1* | 4/2018 | Nakamura | H02K 3/18 |
| 2018/0205296 | A1* | 7/2018 | Funayama | H02K 1/16 |
| 2019/0214874 | A1* | 7/2019 | Hashimoto | H02K 3/28 |
| 2019/0348885 | A1* | 11/2019 | Hattori | B62D 5/0403 |
| 2022/0158515 | A1* | 5/2022 | Funayama | H02K 3/12 |

OTHER PUBLICATIONS

International Search Report in PCT/JP2019/047791 dated Feb. 10, 2020.

* cited by examiner

STATOR WITH COIL HAVING FIRST AND SECOND JOINT PARTS AND CORE HAVING FASTENING MEMBER

TECHNICAL FIELD

The present disclosure relates to a stator.

BACKGROUND ART

Conventionally, there is known a stator including a stator core having fastening holes into which fastening members are inserted. Such a stator is disclosed in, for example, JP 2017-50937 A.

The stator described in JP 2017-50937 A is provided with fastening holes (bolt holes) on an outer circumference side of a stator core. By inserting bolts (fastening members) into the fastening holes, the stator is mounted on a motor case, etc. In addition, a plurality of concentric wound coils are mounted on slots of the stator. The concentric wound coils each are formed by concentrically winding a rectangular conducting wire. In addition, the start and end of winding of the concentric wound coil are provided with lead wire parts. A top end part provided on an end part side of a lead wire part of one concentric wound coil and a top end part provided on an end part side of a lead wire part of another concentric wound coil are joined together on an outside diameter side of the stator core. In addition, the lead wire part of the one concentric wound coil and the lead wire part of another concentric wound coil are joined together, being provided so as to extend in a radial direction.

In addition, when the lead wire parts are provided so as to extend in the radial direction, interference may occur between a joint part (a portion where the top end part of the lead wire part of the one concentric wound coil and the top end part of the lead wire part of another concentric wound coil are joined together), and a bolt inserted into a fastening hole disposed on the outside diameter side of the stator core and a jig for assembling the bolt. Hence, it may be difficult to mount the stator core on a motor case, etc. In view of this, in JP 2017-50937 A, in order that a joint part disposed around a fastening hole does not overlap the fastening hole as viewed in a rotation axis line direction, the joint part is disposed on one circumferential side of the fastening hole (bolt) so as to avoid the fastening hole (bolt).

CITATIONS LIST

Patent Literature

Patent Literature 1: JP 2017-50937 A SUMMARY OF DISCLOSURE

Technical Problems

However, in the stator of JP 2017-50937 A, since a joint part is disposed on one circumferential side of a fastening hole (bolt) so as to avoid the fastening hole (bolt), the spacing between the joint part disposed so as to avoid the fastening hole (bolt) and a joint part adjacent to the joint part is relatively small. Meanwhile, for positioning of top end parts upon joining together the top end parts, an insulation process for the joined top end parts, etc., there is a need to dispose a jig so as to cover the top end parts (around the top end parts). However, in the stator of JP 2017-50937 A, since the spacing between joint parts is relatively small, it may be difficult to dispose the jig. As a result, there is a problem that the mass productivity of stators may deteriorate.

The disclosure is made to solve a problem such as that described above, and provides a stator capable of improving mass productivity while preventing interference between a fastening member and a jig for assembling the fastening member.

Solutions to Problems

To provide the above-described stator, a stator according to one aspect of the disclosure includes: a stator core in which ring-shaped steel sheets are laminated, the stator core having a plurality of teeth forming slots, and the ring-shaped steel sheets having, on an outside diameter side, a fastening hole into which a fastening member is inserted; and a plurality of coils each having a pair of leg parts held in corresponding ones of the slots; connecting parts disposed on outer sides of end surfaces of the stator core and connecting the pair of leg parts; and lead wire parts disposed on an outside diameter side of the stator core, and the stator is provided with: a first joint part formed by joining together a first top end part and a second top end part, with the first top end part and the second top end part provided so as to extend in a radial direction and disposed more on an outside diameter side, as viewed in a rotation axis line direction, than an edge part on an inside diameter side of the fastening member inserted into the fastening hole, the first top end part being provided on an end part side of the lead wire part of a first coil among the plurality of coils, and the second top end part being provided on an end part side of the lead wire part of a second coil among the plurality of coils; and a second joint part formed by joining together a third top end part and a fourth top end part, with the third top end part and the fourth top end part provided so as to extend in a rotation axis line direction so as not to overlap the fastening member as viewed in a rotation axis line direction, the third top end part being provided on an end part side of the lead wire part of a third coil among the plurality of coils and provided at a location corresponding to the fastening member, and the fourth top end part being provided on an end part side of the lead wire part of a fourth coil among the plurality of coils and provided at the location corresponding to the fastening member.

The stator according to the one aspect of the disclosure is, as described above, provided with a second joint part formed by joining together a third top end part provided on an end part side of a lead wire part of a third coil and provided at a location corresponding to a fastening member and a fourth top end part provided on an end part side of a lead wire part of a fourth coil and provided at the location corresponding to the fastening member, with the third top end part and the fourth top end part provided so as to extend in a rotation axis line direction so as not to overlap the fastening member as viewed in a rotation axis line direction. By this, since the second joint part is provided so as to extend in the rotation axis line direction, unlike a case in which joint parts are formed in a circumferential direction for avoidance, the distance between a first joint part and the second joint part relatively increases. As a result, a jig can be easily disposed around the first joint part and the second joint part, and thus, the productivity of the stator can be improved. In addition, since the second joint part is provided so as to extend in the rotation axis line direction, interference between a fastening member and a jig for assembling the fastening member can be prevented. As a result of those facts, mass productivity can be improved while interference between a fastening member and a jig for assembling the fastening member is prevented.

In addition, unlike a case in which all joint parts are formed of second joint parts that extend in the rotation axis line direction, some joint parts are formed of first joint parts. By this, the length in the rotation axis line direction of a portion formed of a first joint part relatively decreases, and thus, other members, etc., can be disposed around the portion formed of the first joint part.

In addition, unlike a case in which all joint parts are formed of second joint parts that extend in the rotation axis line direction, by first joint parts extending in a radial direction, the spacing between top end parts of the first joint parts relatively increases. By this, a jig for processing the top end parts of the first joint parts can be easily disposed, and thus, the mass productivity of the stator can be improved.

Advantageous Effects of Disclosure

According to the present disclosure, as described above, mass productivity can be improved while interference between a fastening member and a jig for assembling the fastening member is prevented.

DESCRIPTION OF EMBODIMENTS

An embodiment of the present disclosure will be described below based on the drawings.

Present Embodiment (Structure of a Stator)

A structure of a stator 100 of the present embodiment will be described with reference to FIGS. 1 to 11.

Figure 1:
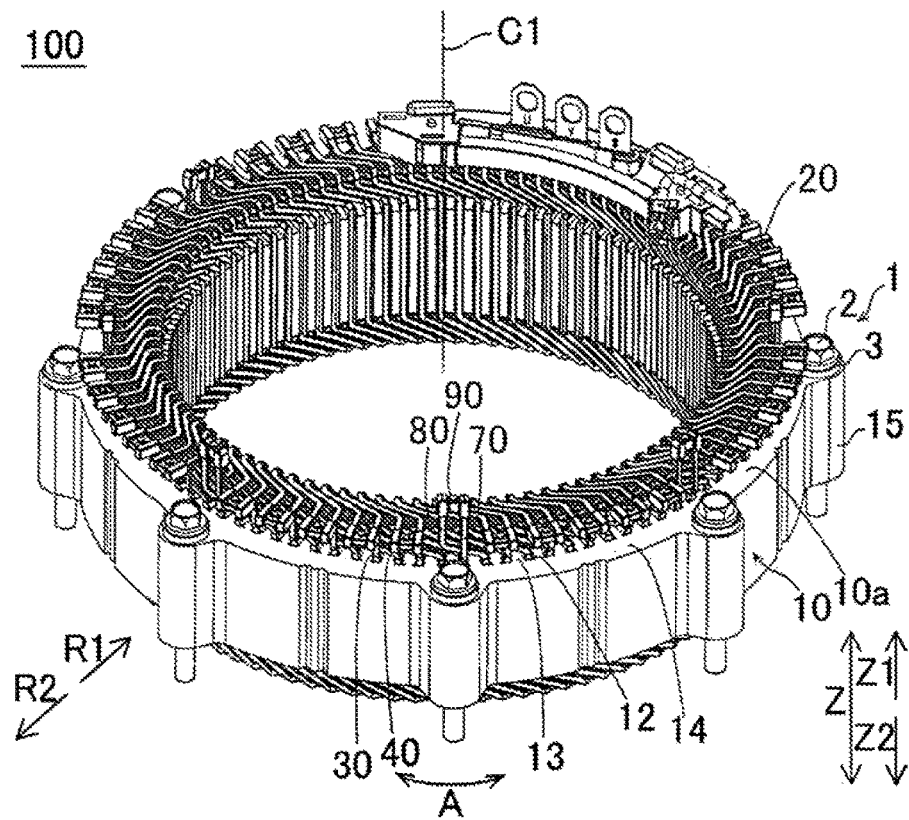
FIG. 1 is a perspective view of a stator of one embodiment.

In the specification of this application, an "axial direction (rotation axis line direction)" refers to, as shown in FIG. 1, a direction (Z-direction) along a central axis line C1 of the stator 100. In addition, a "circumferential direction" refers to a circumferential direction (A-direction) of the stator 100. In addition, a "radial inner side (inside diameter side)" refers to a direction (R1-direction) going toward the central axis line C1 of the stator 100 in a radial direction. In addition, a "radial outer side (outside diameter side)" refers to a direction (R2-direction) going toward the outside of the stator 100 in the radial direction.

As shown in FIG. 1, the stator 100 includes a stator core 10 and a plurality of concentric wound coils 20. Note that the "concentric wound coils 20" are an example of "coils" in the claims.

In addition, the stator core 10 is formed by laminating ring-shaped steel sheets having fastening holes 11 (see FIG. 2) into which bolts 2 are inserted. The stator core 10 is fixed to a housing (not shown), etc., by fastening members 1. In addition, each fastening member 1 includes a bolt 2 and a washer 3. The bolt 2 is inserted into a fastening hole 11 with the washer 3 therebetween. In addition, the stator core 10 has a plurality of teeth 13 that form slots 12. By inserting and fastening the bolts 2 into the fastening holes 11, the stator core 10 is mounted on a stator housing or the like which is not shown. In addition, a back yoke 14 is provided on an outside diameter side of the slots 12. In addition, each fastening hole 11 is disposed in a lug part 15 provided so as to protrude outward from the ring-shaped steel sheets.

In addition, the fastening holes 11 are provided in plural number (eight in the present embodiment). The plurality of fastening holes 11 are provided in the stator core 10 at substantially equiangular intervals (substantially 45-degree intervals).

(Structure of the Concentric Wound Coils)

Each of the plurality of concentric wound coils 20 is formed by winding (concentrically winding) a rectangular conducting wire 21 (see FIG. 3) a plurality of times. In addition, as shown in FIGS. 3 to 6, the stator 100 uses four types of concentric wound coils 30, 40, 50, and 60. Note that the concentric wound coils 30, 40, 50, and 60 are examples of the "coils" in the claims. Note also that the concentric wound coils 30 and 40 are examples of a "first coil" and a "second coil" in the claims, respectively. Note also that the concentric wound coils 50 and 60 are examples of a "third coil" and a "fourth coil" in the claims, respectively.

Figure 11:
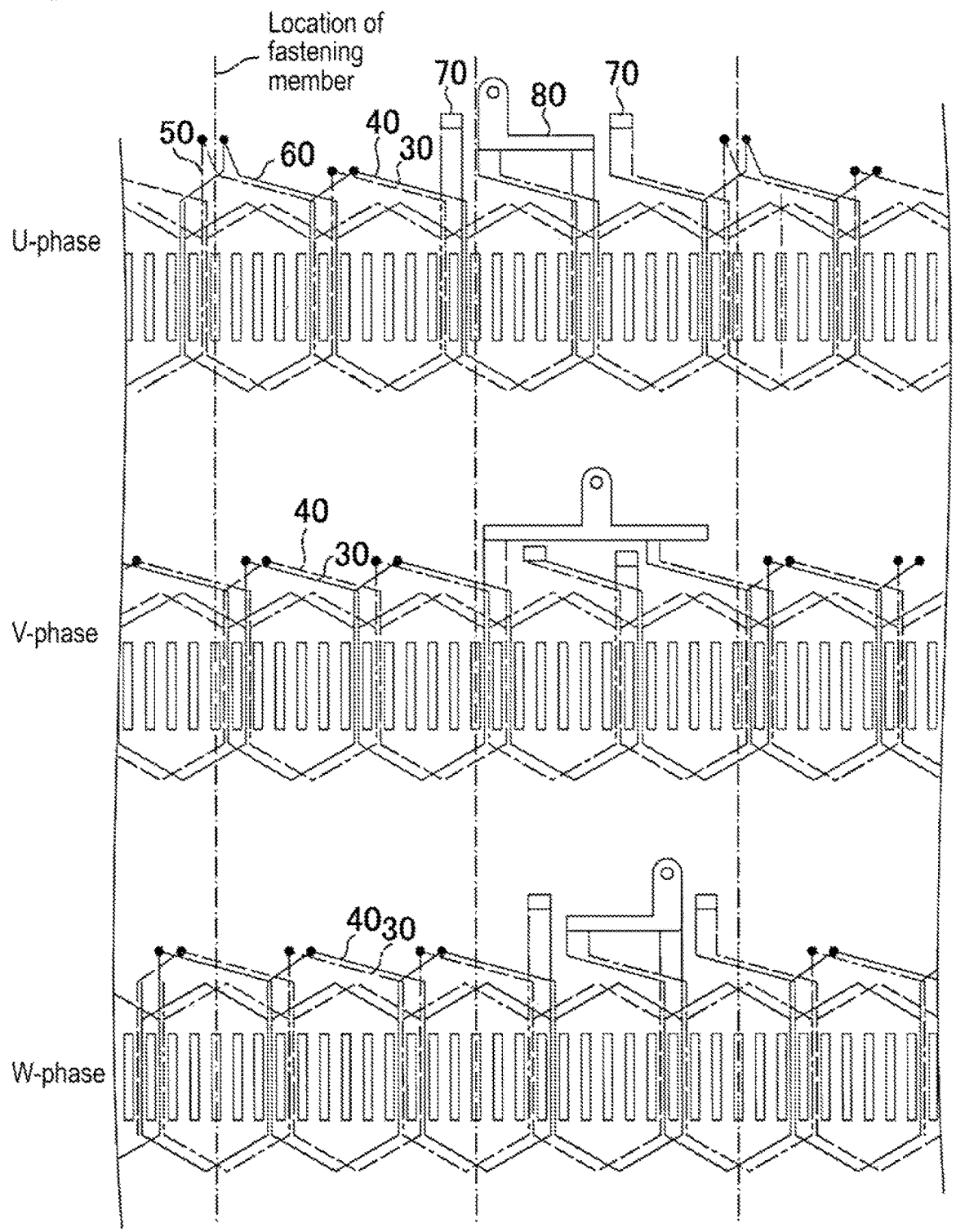
FIG. 11 is a diagram showing disposition of concentric wound coils (windings).

Note that as shown in FIG. 11, the concentric wound coils 30 and the concentric wound coils 40 form, for example, some coils (coils that form first joint parts 22) of a V-phase, a W-phase, and a U-phase. Note also that the concentric wound coils 50 and the concentric wound coils 60 form, for example, some coils (coils that form second joint parts 23) of the U-phase. Note also that in the U-phase, a set of concentric wound coils 30 and 40 and a set of concentric wound coils 50 and 60 are alternately disposed in the circumferential direction.

Figure 3:
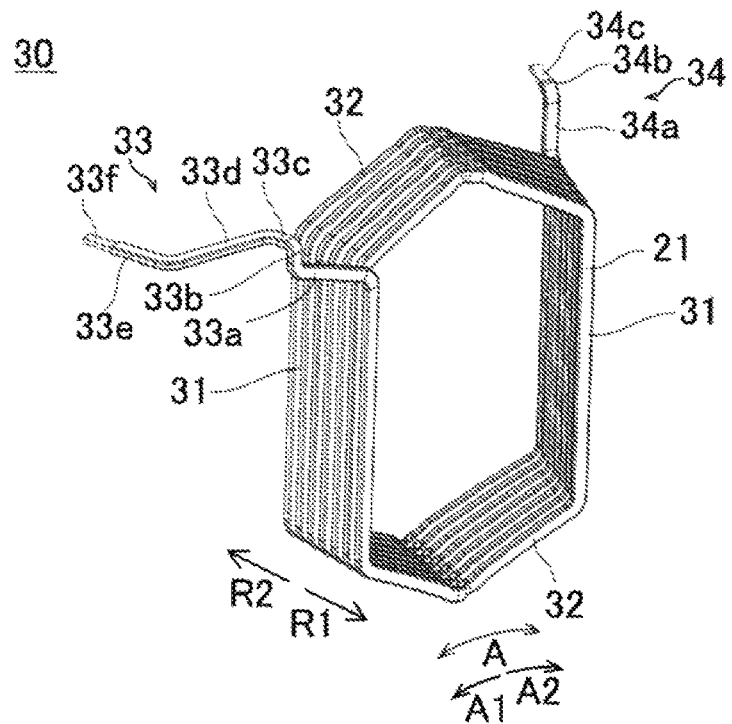
FIG. 3 is a perspective view (1) of a concentric wound coil having joint parts extending in a radial direction of the one embodiment.

As shown in FIG. 3, the concentric wound coil 30 has pairs of leg parts 31 held in slots 12. In addition, the concentric wound coil 30 has connecting parts (coil end parts) 32 that are disposed on outer sides of end surfaces 10a of the stator core 10 (see FIG. 1) and connect the pairs of leg parts 31. In addition, the concentric wound coil 30 has a lead wire part 33 and a lead wire part 34 that are disposed on an outside diameter side of the stator core 10. In addition, the lead wire part 33 corresponds to one end of a rectangular conducting wire 21. In addition, the lead wire part 34 corresponds to the other end of the rectangular conducting wire 21. In addition, the lead wire part 33 continues to a leg part 31 disposed on an innermost diameter side of the concentric wound coil 30. In addition, the lead wire part 34 continues to a leg part 31 disposed on an outermost diameter side of the concentric wound coil 40. Note that the lead wire part 33 and the lead wire part 34 are examples of a "one-side lead wire part" and an "other-side lead wire part" in the claims, respectively.

In addition, as shown in FIG. 3, the lead wire part 33 has a portion extending toward the radial outer side (R2-direction side). The lead wire part 33 is provided so as to extend from the inside diameter side (R1-direction side) to outside diameter side (R2-direction side) of the concentric wound coil 30. Specifically, the lead wire part 33 includes a portion 33a extending along an A1-direction side in the circumferential direction; a portion 33b extending in the rotation axis line direction; a portion 33c extending along the radial outer side (R2-direction side); a portion 33d extending so as to intersect the radial direction, i.e., toward the radial outer side and toward the A1-direction side in the circumferential direction (substantially horizontally); and a portion 33e extending in the radial direction. In addition, in addition, a top end part 33f extending in the radial direction is provided on a top end side of the portion 33e. In addition, an insulating covering of the top end part 33f is removed.

In addition, as shown in FIG. 3, the lead wire part 34 has a portion extending toward the radial outer side (R2-direction side). The lead wire part 34 is disposed on the outside diameter side (R2-direction side) of the concentric wound coil 30. Specifically, the lead wire part 34 includes a portion 34a extending in the rotation axis line direction; and a portion 34b extending along the radial outer side (R2-direction side). In addition, a top end part 34c extending in the radial direction is provided on a top end side of the portion 34b. In addition, an insulating covering of the top end part 34c is removed. Note that the top end parts 33f and 34c are examples of a "first top end part" in the claims.

Figure 4:
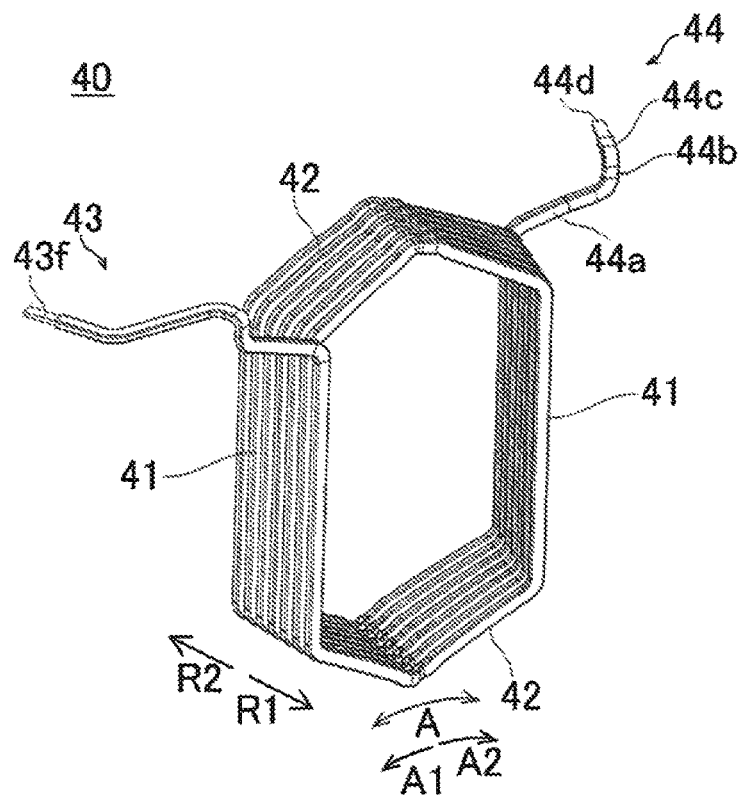
FIG. 4 is a perspective view (2) of a concentric wound coil having joint parts extending in the radial direction of the one embodiment.

As shown in FIG. 4, as with the concentric wound coil 30, the concentric wound coil 40 has pairs of leg parts 41, connecting parts 42, a lead wire part 43, and a lead wire part 44. The configuration of the lead wire part 43 is the same as that of the lead wire part 33 of the above-described concentric wound coil 30. In addition, an insulating covering of a top end part 43f of the lead wire part 43 extending in the radial direction is removed. In addition, the lead wire part 43 continues to a leg part 41 disposed on an innermost diameter side of the concentric wound coil 40. In addition, the lead wire part 44 continues to a leg part 41 disposed on an outermost diameter side of the concentric wound coil 40. Note that the lead wire part 43 and the lead wire part 44 are examples of a "one-side lead wire part" and an "other-side lead wire part" in the claims, respectively.

In addition, as shown in FIG. 4, the lead wire part 44 has a portion extending toward the radial outer side (R2-direction side). Specifically, the lead wire part 44 includes a portion 44a extending along an A2-direction side in the circumferential direction; a portion 44b extending in the rotation axis line direction; and a portion 44c extending along the radial outer side (R2-direction side). In addition, a top end part 44d extending in the radial direction is provided on a top end side of the portion 44c. In addition, an insulating covering of the top end part 44d is removed. Note that the top end parts 43f and 44d are examples of a "second top end part" in the claims. As described above, each of the concentric wound coil 30 and the concentric wound coil 40 has a shape in which both the top end part (33f, 43f) of the one-side lead wire part (33, 43) and the top end part (34c, 44d) of the other-side lead wire part (34, 44) extend in the radial direction.

Figure 5:
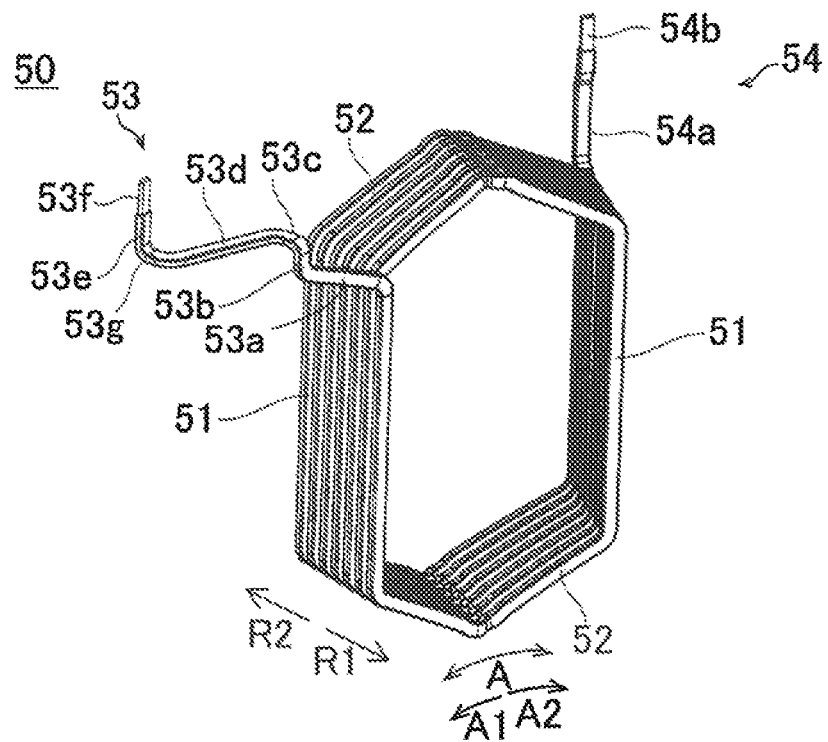
FIG. 5 is a perspective view (1) of a concentric wound coil having joint parts extending in a rotation axis line direction of the one embodiment.

As shown in FIG. 5, the concentric wound coil 50 has pairs of leg parts 51, connecting parts 52, a lead wire part 53, and a lead wire part 54. In addition, the lead wire part 53 continues to a leg part 51 disposed on an innermost diameter side of the concentric wound coil 50. In addition, the lead wire part 54 continues to a leg part 51 disposed on an outermost diameter side of the concentric wound coil 50. Note that the lead wire part 53 and the lead wire part 54 are examples of the "one-side lead wire part" and the "other-side lead wire part" in the claims, respectively.

In addition, the lead wire part 53 has a portion configured such that a portion of the lead wire part 33 extending toward the radial outer side (R2-direction side) is bent and extends toward an axial outer side. The lead wire part 53 is provided so as to extend from the inside diameter side to outside diameter side of the concentric wound coil 50. Specifically, the lead wire part 53 includes a portion 53a extending along the A1-direction side in the circumferential direction; a portion 53b extending in the rotation axis line direction; a portion 53c extending along the radial outer side (R2-direction side); a portion 53d extending so as to intersect the radial direction, i.e., toward the radial outer side and toward the A1-direction side in the circumferential direction (substantially horizontally); and a portion 53e extending in the rotation axis line direction. In addition, a top end part 53f extending in the rotation axis line direction is provided on a top end side of the portion 53e. In addition, an insulating covering of the top end part 53f is removed.

In addition, the lead wire part 53 of the concentric wound coil 50 has a bent part 53g between portions extending toward the radial outer side (the portion 53c and the portion 53d) and the portion 53e extending in the rotation axis line direction, and the bent part 53g is located more on the radial inner side than an edge part E2 on an inside diameter side of a bolt 2. That is, comparing the lead wire part 33 of the concentric wound coil 30 with the lead wire part 53 of the concentric wound coil 50, the lead wire part 53 of the concentric wound coil 50 has a shape in which the portion 33e of the lead wire part 33 of the concentric wound coil 30 is bent flatwise at a location more on the radial inner side than the edge part E2 on the inside diameter side of the bolt 2.

In addition, as shown in FIG. 5, the lead wire part 54 has a portion extending toward the axial outer side without having a portion extending toward the radial outer side (R2-direction side). The lead wire part 54 is disposed on the outside diameter side of the concentric wound coil 50. Specifically, the lead wire part 54 includes a portion 54a extending in the rotation axis line direction. In addition, a top end part 54b extending in the rotation axis line direction is provided on a top end side of the portion 54a. In addition, an insulating covering of the top end part 54b is removed. Note that the top end parts 53f and 54b are examples of a "third top end part" in the claims.

In addition, the portion 54a (top end part 54b) of the lead wire part 53 is located more on the radial inner side than the edge part E2 on the inside diameter side of the bolt 2. That is, comparing the lead wire part 34 of the concentric wound coil 30 with the lead wire part 54 of the concentric wound coil 50, the lead wire part 54 of the concentric wound coil 50 has a shape in which the portion 34b of the lead wire part 34 of the concentric wound coil 30 is bent flatwise at a location more on the radial inner side than the edge part E2 on the inside diameter side of the bolt 2.

Figure 6:
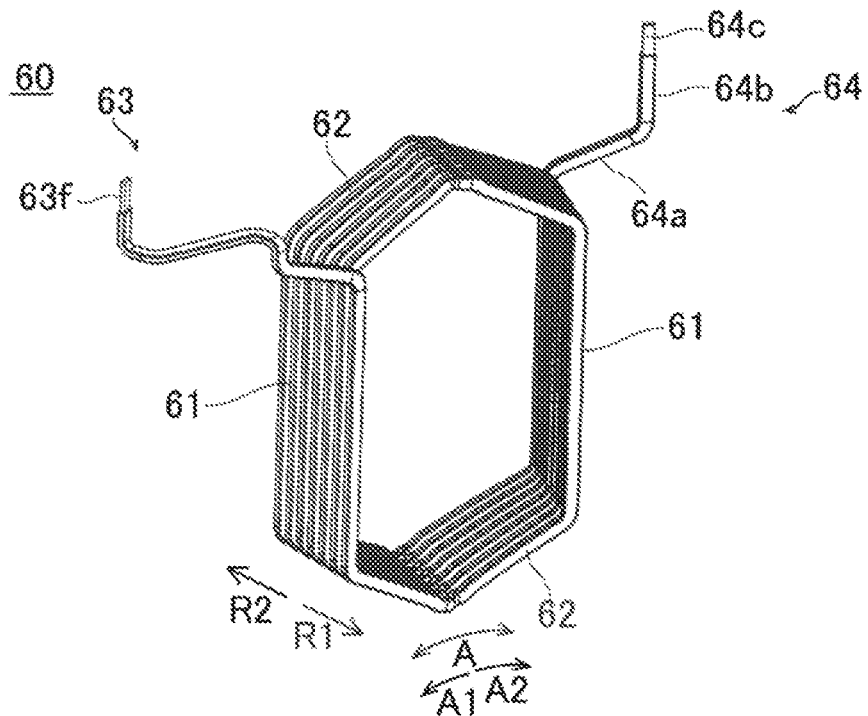
FIG. 6 is a perspective view (2) of a concentric wound coil having joint parts extending in the rotation axis line direction of the one embodiment.

As shown in FIG. 6, as with the concentric wound coil 50, the concentric wound coil 60 has pairs of leg parts 61, connecting parts 62, a lead wire part 63, and a lead wire part 64. In addition, the lead wire part 63 continues to a leg part 61 disposed on an innermost diameter side of the concentric wound coil 60. In addition, the lead wire part 64 continues to a leg part 61 disposed on an outermost diameter side of the concentric wound coil 60. Note that the lead wire part 63 and the lead wire part 64 are examples of the "one-side lead wire part" and the "other-side lead wire part" in the claims, respectively.

The lead wire part 63 is provided so as to extend from the inside diameter side to outside diameter side of the concentric wound coil 60. Note that the configuration of the lead wire part 63 is the same as that of the lead wire part 53 of the above-described concentric wound coil 50. That is, the lead wire part 63 has a portion configured such that a portion of the lead wire part 43 extending toward the radial outer side (R2-direction side) is bent and extends toward the axial outer side. In addition, a top end part 63*f* extending in the rotation axis line direction is provided on a top end side of the lead wire part 63. In addition, an insulating covering of the top end part 63*f* is removed.

In addition, as shown in FIG. 6, the lead wire part 64 is disposed on the outside diameter side of the concentric wound coil 60. In addition, the lead wire part 64 has a portion extending toward the axial outer side without having a portion extending toward the radial outer side (R2-direction side). Specifically, the lead wire part 64 includes a portion 64*a* extending along the A2-direction side in the circumferential direction; and a portion 64*b* extending in the rotation axis line direction. In addition, a top end part 64*c* extending in the rotation axis line direction is provided on a top end side of the portion 64*b*. In addition, an insulating covering of the top end part 64*c* is removed. Note that the top end parts 64*f* and 64*c* are examples of a "fourth top end part" in the claims.

In addition, the portion 64*b* (top end part 63*c*) of the lead wire part 64 is located more on the radial inner side than the edge part E2 on the inside diameter side of the bolt 2. That is, comparing the lead wire part 44 of the concentric wound coil 40 with the lead wire part 64 of the concentric wound coil 60, the lead wire part 64 of the concentric wound coil 60 has a shape in which the portion 44*c* of the lead wire part 44 of the concentric wound coil 40 is bent flatwise at a location more on the radial inner side than the edge part E2 on the inside diameter side of the bolt 2.

In addition, the lead wire part 53, the lead wire part 63, the lead wire part 54, and the lead wire part 64 are formed around second joint parts 23 which will be described later, so as to extend in the rotation axis line direction. Specifically, each of the concentric wound coil 50 and the concentric wound coil 60 has a shape in which both the top end part (53*f*, 63*f*) of the one-side lead wire part (53, 63) and the top end part (54*b*, 64*c*) of the other-side lead wire part (54, 64) extend in the rotation axis line direction.

Figure 7:
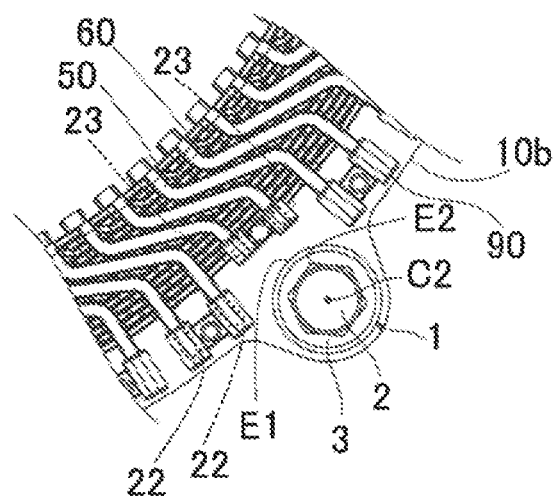
FIG. 7 is a top view of the stator of the one embodiment.
Figure 8:
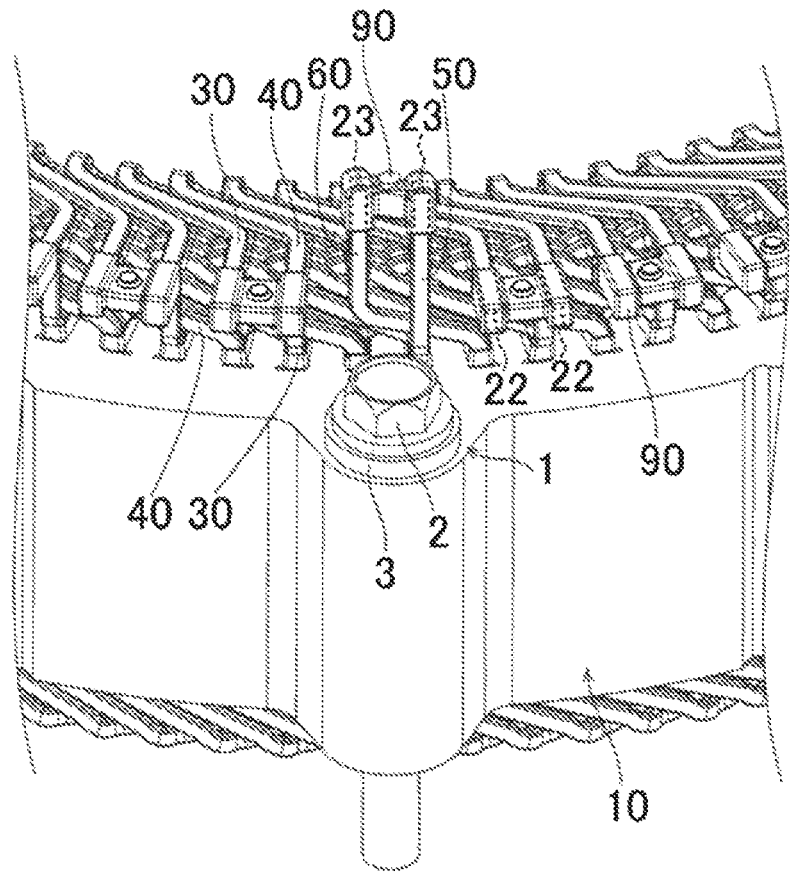
FIG. 8 is a partially enlarged view of FIG. 1.

Here, in the present embodiment, as shown in FIGS. 7 and 8, a first joint part 22 is provided that is formed by joining together the top end part 33*f* (34*c*) provided on the end part side of the lead wire part 33 (34) of the concentric wound coil 30 and the top end part 44*d* (43*f*) provided on the end part side of the lead wire part 44 (43) of the concentric wound coil 40, with the top end part 33*f* (34*c*) and the top end part 44*d* (43*f*) disposed more on the outside diameter side, as viewed in the rotation axis line direction, than an edge part E1 on an inside diameter side of a fastening member 1 which is inserted into a fastening hole 11, and provided so as to extend in the radial direction.

Figure 9:
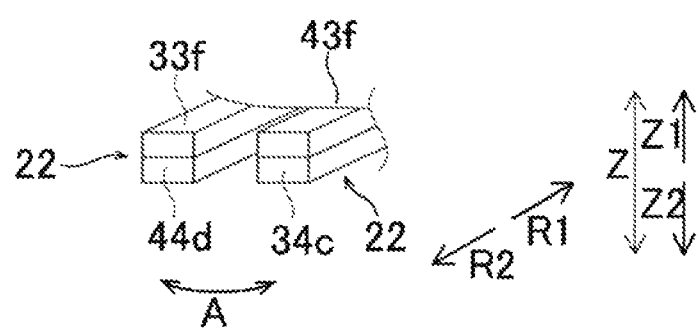
FIG. 9 is a schematic diagram of joint parts extending in the radial direction.

Specifically, in the present embodiment, as shown in FIG. 9, first joint parts 22 are formed by joining together the top end parts 33*f* (34*c*) and 44*d* (43*f*), with both the top end parts 33*f* (34*c*) and 44*d* (43*f*) extending toward the radial outer side, the top end part 33*f* and the top end part 44*d* stacked on top of each other in the rotation axis line direction, and the top end part 43*f* and the top end part 34*c* stacked on top of each other in the rotation axis line direction.

In addition, in the present embodiment, as shown in FIGS. 7 and 8, a second joint part 23 is provided that is formed by joining together the top end part 53*f* (54*b*) provided on the end part side of the lead wire part 53 (54) of the concentric wound coil 50 and provided at a location corresponding to a fastening member 1 and the top end part 64*c* (64*f*) provided on the end part side of the lead wire part 64 (63) of the concentric wound coil 60 and provided at the location corresponding to the fastening member 1, with the top end part 53*f* (54*b*) and the top end part 64*c* (64*f*) provided so as to extend in the rotation axis line direction so as not to overlap the fastening member 1 as viewed in the rotation axis line direction.

Figure 10:
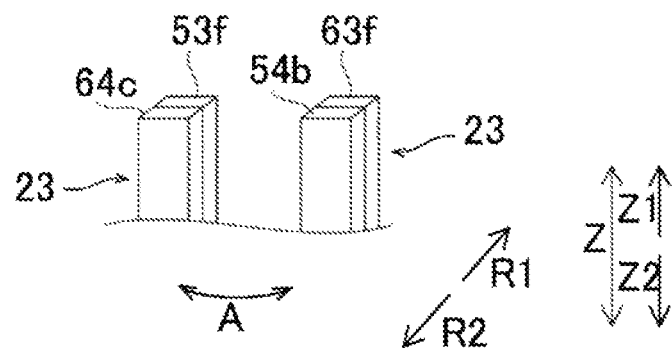
FIG. 10 is a schematic diagram of joint parts extending in the rotation axis line direction.

Specifically, in the present embodiment, as shown in FIG. 10, second joint parts 23 are formed by joining together the top end parts 53*f* (54*b*) and 64*c* (63*f*), with both the top end parts 53*f* (54*b*) and 64*c* (63*f*) extending in the rotation axis line direction, the top end part 53*f* and the top end part 64*c* stacked on top of each other in the radial direction, and the top end part 63*f* and the top end part 54*b* stacked on top of each other in the radial direction.

In addition, in the present embodiment, as shown in FIGS. 7 and 8, the second joint parts 23 are disposed more on the inside diameter side than the first joint parts 22 as viewed in the rotation axis line direction. Specifically, the first joint parts 22 are disposed on an outside diameter side of the back yoke 14 as viewed in the rotation axis line direction. On the other hand, the second joint parts 23 are disposed on an inside diameter side of the back yoke 14.

In addition, in the present embodiment, the second joint parts 23 are provided in plural number (two in the present embodiment) so as to be adjacent to each other in the circumferential direction. The second joint parts 23 provided in plural number so as to be adjacent to each other in the circumferential direction have the same phase (e.g., the U-phase).

In addition, in the present embodiment, an insulating covering part 90 is provided so as to cover the second joint parts 23. The insulating covering part 90 is provided so as to cover the second joint parts 23 of the same phase that are provided in plural number (two in the present embodiment) so as to be adjacent to each other. The insulating covering part 90 is made of, for example, a resin. That is, four lead wire parts (top end parts) are covered by one insulating covering part 90. Note that the first joint parts 22 provided in plural number (two in the present embodiment) so as to be adjacent to each other are also covered by an insulating covering part 90. In addition, the plurality of first joint parts 22 covered by the insulating covering part 90 have the same phase (the U-phase, the V-phase, or the W-phase).

In addition, in the present embodiment, as shown in FIG. 1, the fastening holes 11 into which the fastening members 1 are inserted are provided in plural number in the circumferential direction at equiangular intervals. Specifically, eight fastening holes 11 are provided. The second joint parts 23 (specifically, sets of second joint parts 23) are provided in plural number so as to correspond to the circumferential locations of the respective plurality (eight) fastening holes 11. The sets of second joint parts 23 are provided in plural number (seven). Note that as shown in FIG. 11, the second joint parts 23 (concentric wound coils 50 and 60) are not provided around neutral wires 70 and a power wire 80. Note also that the seven sets of second joint parts 23 have the same phase (e.g., the U-phase).

In addition, in the present embodiment, as shown in FIGS. 7 and 8, the circumferential location of the fastening member 1 overlaps the circumferential locations of the second joint parts 23 as viewed in the radial direction. Specifically, the second joint parts 23 are located in an area smaller than the circumferential width of the fastening member 1. Note that in the present embodiment, the circumferential locations of all of the plurality of second joint parts 23 overlap the circumferential locations of the fastening members 1 as viewed in the radial direction; on the other hand, the second joint parts 23 may be provided at locations where the second joint parts 23 do not overlap the circumferential locations of the fastening members 1.

In addition, in the present embodiment, as shown in FIG. 7, the first joint parts 22 are disposed more on the inside diameter side than an outer circumferential surface 10b of the stator core 10 as viewed in the rotation axis line direction. Note that the edge part E2 on the inside diameter side of the bolt 2 and the edge part E1 on the inside diameter side of the washer 3 are disposed more on the inside diameter side than the outer circumferential surface 10b of the stator core 10.

In addition, in the present embodiment, as shown in FIGS. 7 and 8, the first joint part 22 (at least a part of the first joint part 22) is disposed more on the radial outer side than the edge part E2 on the inside diameter side of the bolt 2 and the edge part E1 on the inside diameter side of the washer 3 as viewed in the rotation axis line direction, and is provided in plural number. The plurality of first joint parts 22 are disposed so as to radially extend toward the radial outer side.

In addition, in the present embodiment, the second joint part 23 (all portions of the second joint part 23) is disposed more on the radial inner side than the edge part E2 on the inside diameter side of the bolt 2 and the edge part E1 on the inside diameter side of the washer 3 as viewed in the rotation axis line direction.

In addition, as shown in FIG. 7, the first joint parts 22 and the second joint parts 23 are disposed more on the inside diameter side than a central axis line C2 of the fastening member 1 as viewed in the rotation axis line direction. In addition, the first joint parts 22 and the second joint parts 23 are disposed more on the inside diameter side than an edge part E3 on the inside diameter side of the fastening hole 11 (see FIG. 2) as viewed in the rotation axis line direction.

Figure 2:
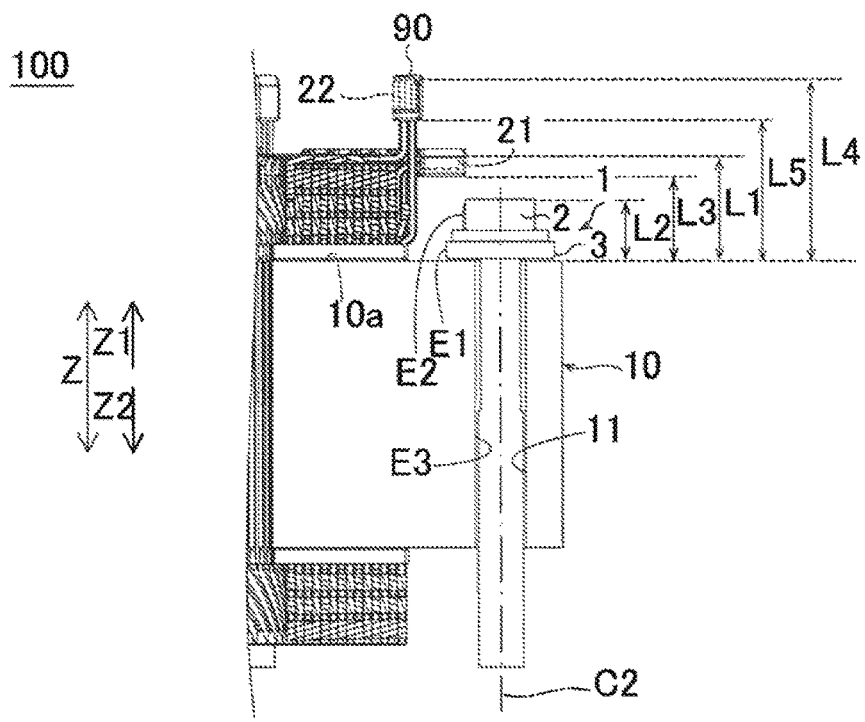
FIG. 2 is a cross-sectional view of the stator of the one embodiment.

In addition, in the present embodiment, as shown in FIG. 2, an axial distance L1 from an upper end of the first joint part 22 to an end surface 10a of the stator core 10 is greater than an axial distance L2 from an upper end of the fastening member 1 (bolt 2) to the end surface 10a of the stator core 10. Specifically, an axial distance L3 from a lower end of the first joint part 22 to the end surface 10a is also greater than the axial distance L2 from the upper end of the fastening member 1 (bolt 2) to the end surface 10a. In addition, an axial distance L4 from an upper end of the second joint part 23 to the end surface 10a and an axial distance L5 from a lower end to the end surface 10a are greater than the axial distance L1 from the upper end of the first joint part 22 and the axial distance L2 from the upper end of the fastening member 1 (bolt 2) to the end surface 10a.

Advantageous Effects of the Present Embodiment

In the present embodiment, the following advantageous effects can be obtained.

In the present embodiment, as described above, a second joint part (23) is provided that is formed by joining together a third top end part (53f, 54b) provided on an end part side of a lead wire part (53, 54) of a third coil (50) and provided at a location corresponding to a fastening member (1) and a fourth top end part (63f, 64c) provided on an end part side of a lead wire part (63, 64) of a fourth coil (60) and provided at the location corresponding to the fastening member (1), with the third top end part (53f, 54b) and the fourth top end part (63f, 64c) provided so as to extend in the rotation axis line direction so as not to overlap the fastening member (1) as viewed in the rotation axis line direction. By this, since the second joint part (23) is provided so as to extend in the rotation axis line direction, unlike a case in which joint parts are formed in the circumferential direction for avoidance, the distance between a first joint part (22) and the second joint part (23) relatively increases. As a result, a jig (a jig for covering by insulating covering parts (90)) can be easily disposed around the first joint part (22) and the second joint part (23), and thus, the productivity of a stator (100) can be improved. In addition, since the second joint part (23) is provided so as to extend in the rotation axis line direction, interference between a fastening member (1) and a jig for assembling the fastening member (1) can be prevented. As a result of those facts, mass productivity can be improved while interference between a fastening member (1) and a jig for assembling the fastening member (1) is prevented.

In addition, unlike a case in which all joint parts are formed of second joint parts (23) that extend in the rotation axis line direction, some joint parts are formed of first joint parts (22). By this, the length in the rotation axis line direction of a portion formed of a first joint part (22) relatively decreases, and thus, other members, etc., can be disposed around the portion formed of the first joint part (22).

In addition, unlike a case in which all joint parts are formed of second joint parts (23) that extend in the rotation axis line direction, by first joint parts (22) extending in the radial direction (radial outer side), the spacing between top end parts (33f, 34c, 43f, and 44d) of the first joint parts (22) relatively increases. By this, a jig for processing the top end parts (33f, 34c, 43f, and 44d) of the first joint parts (22) can be easily disposed, and thus, the mass productivity of the stator (100) can be improved.

In addition, in the present embodiment, as described above, the second joint part (23) is disposed more on the inside diameter side than the first joint part (22) as viewed in the rotation axis line direction. By such a configuration, since the second joint part (23) is disposed on the inside diameter side, interference between the second joint part (23) and a jig for assembling the stator (100) can be easily prevented.

In addition, in the present embodiment, as described above, the circumferential location of a fastening member (1) overlaps the circumferential locations of second joint parts (23) as viewed in the radial direction. By such a configuration, the second joint parts (23) can be disposed so as not to overlap the fastening member (1) as viewed in the rotation axis line direction. In addition, when the circumferential locations of all of the second joint parts (23) overlap the circumferential locations of the fastening members (1), since the second joint parts (23) can be disposed in relatively narrow areas in the circumferential direction, portions formed of the first joint parts (22) can be made relatively large. As a result, relatively large other members, etc., can be disposed around the portions formed of the first joint parts (22).

In addition, in the present embodiment, as described above, fastening holes (11) into which fastening members (1) are inserted are provided in plural number in the circumferential direction at equiangular intervals, and the second joint parts (23) are provided so as to correspond to the circumferential locations of the respective plurality of fastening holes (11). By such a configuration, since the plurality of second joint parts (23) have the same phase, unlike a case in which the second joint parts (23) are provided for each phase, an increase in the type (shape) of coils (20) forming the second joint parts (23) can be suppressed.

In addition, in the present embodiment, as described above, an insulating covering part (90) that covers second joint parts (23) is provided. By this, the second joint parts (23) can be easily insulated by the insulating covering part (90).

In addition, in the present embodiment, as described above, the second joint parts (23) are provided in plural number so as to be adjacent to each other in the circumferential direction, and the second joint parts (23) provided in plural number so as to be adjacent to each other in the circumferential direction have the same phase. By such a configuration, since the second joint parts (23) provided in plural number so as to be adjacent to each other have the same phase, insulation of the second joint parts (23) provided in plural number so as to be adjacent to each other can be easily ensured.

In addition, in the present embodiment, as described above, in the stator (100), an insulating covering part (90) is provided so as to cover second joint parts (23) of the same phase provided in plural number so as to be adjacent to each other. By such a configuration, since the second joint parts (23) of the same phase are covered by the insulating covering part (90), the second joint parts (23) can be prevented from being short-circuited with each other through the insulating covering part (90).

In addition, in the present embodiment, as described above, the first joint part (22) is disposed more on the inside diameter side than an outer circumferential surface (10b) of a stator core (10) as viewed in the rotation axis line direction. By such a configuration, comparing with a case in which the first joint part (22) is disposed more on the outside diameter side than the outer circumferential surface (10b) of the stator core (10), the radial size of the stator (100) can be reduced.

In addition, in the present embodiment, as described above, a first joint part (22) is formed by joining together a first top end part (33f, 34c) and a second top end part (43f, 44d), with both the first top end part (33f, 34c) and the second top end part (43f, 44d) extending toward the radial outer side, and the first top end part (33f, 34c) and the second top end part (43f, 44d) stacked on top of each other in the rotation axis line direction. In addition, a second joint part (23) is formed by joining together a third top end part (53f, 54b) and a fourth top end part (63f, 64c), with both the third top end part (53f, 54b) and the fourth top end part (63f, 64c) extending in the rotation axis line direction, and the third top end part (53f, 54b) and the fourth top end part (63f, 64c) stacked on top of each other in the radial direction. By such a configuration, comparing with a case in which all top end parts are joined together, being arranged in the circumferential direction, the spacing between first joint parts (22) and the spacing between a first joint part (22) and a second joint part (23) increase, and thus, insulation between joint parts can be easily ensured.

In addition, in the present embodiment, as described above, an axial distance (L1) from an upper end of a first joint part (22) to an end surface (10a) of the stator core (10) is greater than an axial distance (L2) from an upper end (10) of a fastening member (1) to the end surface (10a) of the stator core. By such a configuration, the height of the fastening member (1) relatively decreases, and thus, interference between the fastening member (1) and other members can be suppressed.

In addition, in the present embodiment, as described above, each of a plurality of coils (20) is formed by winding a rectangular conducting wire (21) a plurality of times, and lead wire parts of each of the plurality of coils (20) include: a one-side lead wire part disposed on a one-end side of the rectangular conducting wire (21) and provided so as to extend from the inside diameter side to outside diameter side of the stator core (10); and an other-side lead wire part disposed on an other-end side of the rectangular conducting wire (21) and provided on the outside diameter side of the stator core (10). Each of a first coil (30) and a second coil (40) has a shape in which both of a top end part (33f, 43f) of a one-side lead wire part (33, 43) and a top end part (34c, 44d) of an other-side lead wire part (34, 44) extend in the radial direction. In addition, each of a third coil (50) and a fourth coil (60) has a shape in which both of a top end part (53f, 63f) of a one-side lead wire part (53, 63) and a top end part (54b, 64c) of an other-side lead wire part (54, 64) extend in the rotation axis line direction. By such a configuration, since the shapes of the third coil (50) and the fourth coil (60) can be made identical, only by adding one type of coils as the third coil (50) and the fourth coil (60) to the first coil (30) and the second coil (40), mass productivity can be improved while interference between a fastening member (1) and a jig for assembling the fastening member (1) is easily prevented.

In addition, in the present embodiment, as described above, first joint parts (22) are provided in plural number and disposed more on the radial outer side than edge parts (E1 and E2) on the inside diameter side of a fastening member (1) as viewed in the rotation axis line direction, and the plurality of first joint parts (22) are disposed so as to radially extend toward the radial outer side. By such a configuration, the spacing between edge parts on the radial outer side of the first joint parts (22) securely increases, and thus, a jig for processing top end parts (33f, 34c, 43f, 44d) of the first joint parts (22) can be securely disposed.

In addition, in the present embodiment, as described above, second joint parts (23) are disposed more on the radial inner side than the edge parts (E1 and E2) on the inside diameter side of the fastening member (1) as viewed in the rotation axis line direction. By such a configuration, since the spacing between a first joint part (22) and a second joint part (23) relatively increases, a jig for processing a top end part (33f, 34c, 43f, 44d) of the first joint part (22) and a top end part (53f, 54b, 63f, 64c) of the second joint part (23) can be easily disposed.

[Variants]

Note that the presently disclosed embodiment is to be considered in all respects as illustrative and not restrictive. The scope of the present disclosure is indicated by the claims rather than the description of the above-described embodiment, and all changes (variants) which come within the meaning and range of equivalency of the claims are further embraced therein.

For example, although the above-described embodiment shows an example in which a stator core (electromagnetic steel sheets) is provided with eight fastening holes, the present disclosure is not limited thereto. For example, a number of fastening holes other than eight may be provided in the stator core (electromagnetic steel sheets).

In addition, although the above-described embodiment shows an example in which the top end parts of concentric wound coils of the U-phase are provided so as to extend in the rotation axis line direction, the present disclosure is not limited thereto. For example, the top end parts of concentric wound coils of the V-phase or the W-phase may be provided so as to extend in the rotation axis line direction.

In addition, although the above-described embodiment shows an example in which two second joint parts provided so as to extend in the rotation axis line direction are arranged in the circumferential direction, the present disclosure is not limited thereto. For example, three or more second joint parts may be arranged in the circumferential direction.

In addition, although the above-described embodiment shows an example in which two first joint parts (second joint parts) arranged in the circumferential direction are covered by one insulating covering part, the present disclosure is not limited thereto. For example, an insulating covering part may be provided for each joint part.

In addition, although the above-described embodiment shows an example in which the first joint parts provided so as to extend in the radial direction are disposed more on the inside diameter side than the outer circumferential surface of the stator core, the present disclosure is not limited thereto. For example, the first joint parts may be disposed more on the outside diameter side than the outer circumferential surface of the stator core.

In addition, although the above-described embodiment shows an example in which top end parts of two lead wire parts are joined together, being stacked on top of each other in the rotation axis line direction or the radial direction, the present disclosure is not limited thereto. For example, top end parts of two lead wire parts may be joined together, being stacked on top of each other in the circumferential direction.

In addition, although the above-described embodiment shows an example in which a one-side lead wire part 33 (43, 53, 63) of a concentric wound coil 30 (40, 50, and 60) has a portion 33d (53d) extending along the A1-direction side, the present disclosure is not limited thereto. For example, a one-side lead wire part of a concentric wound coil may not have a portion extending along the A1-direction side.

In addition, although the above-described embodiment shows an example in which an other-side lead wire part 44 (64) of a concentric wound coil 40 (60) has a portion 44a (64a) extending along the A2-direction side, the present disclosure is not limited thereto. For example, an other-side lead wire part of a concentric wound coil may not have a portion extending along the A2-direction side.

REFERENCE SIGNS LIST

1: Fastening member, 10: Stator core, 10a: End surface, 10b: Outer circumferential surface, 11: Fastening hole, 12: Slot, 13: Tooth, 20, 30, 40, 50, 60: Concentric wound coil (coil), 21: Rectangular conducting wire, 22: First joint part, 23: Second joint part, 30: Concentric wound coil (coil and first coil), 31, 41, 51, 61: Leg part, 32, 42, 52, 62: Connecting part, 33, 43, 53, 63: Lead wire part (one-side lead wire part), 33f, 34c: Top end part (first top end part), 34, 44, 54, 64: Lead wire part (other-side lead wire part), 40: Concentric wound coil (coil and second coil), 43f, 44d: Top end part (second top end part), 50: Concentric wound coil (coil and third coil), 53f, 54b: Top end part (third top end part), 60: Concentric wound coil (coil and fourth coil), 63f, 64c: Top end part (fourth top end part), 90: Insulating covering part, 100: Stator, and E1: Edge part

The invention claimed is:
1. A stator comprising:
a stator core in which ring-shaped steel sheets are laminated, the stator core having a plurality of teeth forming slots, and the ring-shaped steel sheets having, on an outside diameter side, a fastening hole into which a fastening member is inserted; and
a plurality of coils each having a pair of leg parts held in corresponding ones of the slots; connecting parts disposed on outer sides of end surfaces of the stator core and connecting the pair of leg parts; and lead wire parts disposed on an outside diameter side of the stator core, wherein
the stator is provided with:
a first joint part formed by joining together a first top end part and a second top end part, with the first top end part and the second top end part provided so as to extend in a radial direction and disposed more on an outside diameter side, as viewed in a rotation axis line direction, than an edge part on an inside diameter side of the fastening member inserted into the fastening hole, the first top end part being provided on an end part side of the lead wire part of a first coil among the plurality of coils, and the second top end part being provided on an end part side of the lead wire part of a second coil among the plurality of coils; and
a second joint part formed by joining together a third top end part and a fourth top end part, with a longest dimension of the third top end part and the fourth top end part provided so as to extend in a rotation axis line direction so as not to overlap the fastening member as viewed in a rotation axis line direction, the third top end part being provided on an end part side of the lead wire part of a third coil among the plurality of coils and provided at a location corresponding to the fastening member, and the fourth top end part being provided on an end part side of the lead wire part of a fourth coil among the plurality of coils and provided at the location corresponding to the fastening member.

2. The stator according to claim 1, wherein the second joint part is disposed more on an inside diameter side than the first joint part as viewed in a rotation axis line direction.

3. The stator according to claim 1, wherein a circumferential location of the fastening member overlaps a circumferential location of the second joint part as viewed in a radial direction.

4. The stator according to claim 1, wherein
the fastening hole into which the fastening member is inserted is provided in plural number in a circumferential direction at equiangular intervals, and
the second joint part is provided in plural number so as to correspond to circumferential locations of the respective plurality of fastening holes.

5. The stator according to claim 1, further comprising an insulating covering part provided so as to cover the second joint part.

6. The stator according to claim 1, wherein the first joint part is disposed more on an inside diameter side than an outer circumferential surface of the stator core as viewed in a rotation axis line direction.

7. The stator according to claim 1, wherein
the first joint part is formed by joining together the first top end part and the second top end part, with both the first top end part and the second top end part extending toward a radial outer side, and the first top end part and the second top end part stacked on top of each other in a rotation axis line direction, and
the second joint part is formed by joining together the third top end part and the fourth top end part, with both the third top end part and the fourth top end part extending in a rotation axis line direction, and the third top end part and the fourth top end part stacked on top of each other in a radial direction.

8. The stator according to claim 1, wherein an axial distance from an upper end of the first joint part to an end surface of the stator core is greater than an axial distance from an upper end of the fastening member to an end surface of the stator core.

9. The stator according to claim 1, wherein
each of the plurality of coils is formed by winding a rectangular conducting wire a plurality of times,
the lead wire parts of each of the plurality of coils include: a one-side lead wire part disposed on a one-end side of the rectangular conducting wire and provided so as to extend from an inside diameter side to an outside diameter side of the stator core; and an other-side lead wire part disposed on an other-end side of the rectangular conducting wire and provided on an outside diameter side of the stator core,
each of the first coil and the second coil has a shape in which both a top end part of the one-side lead wire part and a top end part of the other-side lead wire part extend in a radial direction, and
each of the third coil and the fourth coil has a shape in which both a top end part of the one-side lead wire part and a top end part of the other-side lead wire part extend in a rotation axis line direction.

10. The stator according to claim 1, wherein
the first joint part is provided in plural number and disposed more on a radial outer side than an edge part on an inside diameter side of the fastening member as viewed in a rotation axis line direction, and
the plurality of first joint parts are disposed so as to radially extend toward a radial outer side.

11. The stator according to claim 1, wherein the second joint part is disposed more on a radial inner side than an edge part on an inside diameter side of the fastening member as viewed in a rotation axis line direction.

12. The stator according to claim 1, wherein
the second joint part is provided in plural number so as to be adjacent to each other in a circumferential direction, and
the second joint parts provided in plural number so as to be adjacent to each other in a circumferential direction have a same phase.

13. The stator according to claim 12, further comprising an insulating covering part provided so as to cover the second joint parts,
wherein
the insulating covering part is provided so as to cover the second joint parts of the same phase provided in plural number so as to be adjacent to each other.

* * * * *